UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

RESINOUS PRODUCTS AND METHOD OF PRODUCING SAME.

1,194,201.

Specification of Letters Patent.  Patented Aug. 8, 1916.

No Drawing.   Application filed June 14, 1912.   Serial No. 703,704.

*To all whom it may concern:*

Be it known that I, JAMES P. A. McCoy, a subject of the King of Great Britain, and a resident of Wilkinsburg, in the county of Allegheny and State of Pennsylvania, have invented a new and useful Improvement in Resinous Products and Methods of Producing the Same, of which the following is a specification.

My invention relates to resinous products and methods of producing the same, and it has particular reference to the manufacture of resin-like condensation products by reacting upon phenol or its homologues with a sulfur chlorid or with a reaction product of sulfur chlorid with an oleaginous substance, and then treating the resulting product with formaldehyde or its polymers.

Hereinafter in the specification and claims, the word "phenol" is intended to include its homologues, isomers or mixtures thereof that are equivalent thereto, and the polymers of formaldehyde or other substances which give off or engender formaldehyde are embraced in the word "formaldehyde."

One object of my invention is to provide a cheap, solid, insoluble, infusible resin-like product which has a high dielectric strength and which may be readily polished, cut, turned or molded into any desired shape or configuration.

Another object is to improve and simplify the methods of producing substances of the above-indicated character and to provide a method that may conveniently be practised upon a large commercial scale with considerable economy and in such manner that the reactions involved may be easily controlled and may be arrested at any desired stage in the procedure in order to secure intermediate products having particular characteristics and properties.

Another object of my invention is to provide a method of producing substances of the general class referred to, that may be expeditiously and reliably practised to produce products having uniform and definite characteristics and properties.

I have discovered that sulfur chlorid will react upon phenol or its homologues to form products that may be transformed into resin-like substances which soften on heating and are soluble in the usual solvents, such as alcohol, acetone, phenol and benzol. However, the reaction between phenol and the sulfur chlorids is extremely violent and rapid and I prefer to moderate its action by the use of an oil or fat or other suitable means. The oil or fat may be mixed with the phenol prior to the introduction of a sulfur chlorid or, in the preferred mode of procedure, I employ a substance known as "factis" or "oil rubber" which is a solid comprising an oil, fat or other oleaginous substance which has been reacted upon by a sulfur chlorid. The use of "factis" is particularly desirable inasmuch as it not only produces a reaction that is less violent than the reaction between sulfur chlorid and phenol, but it also appears to act as a condensing catalyst in bringing about the final condensation with formaldehyde. In addition, the factis contributes to a considerable degree to the bulk of the resulting product, and as factis is a relatively inexpensive material, it serves to reduce the cost of the final product.

Factis itself is soluble in phenols, and the free sulfur chlorid which it always contains reacts with the phenol just as unmixed sulfur chlorid would do. This reaction is greatly moderated by the sulfurized oil which constitutes the major portion of the factis. The reaction product of phenol and the sulfur chlorid also acts as a condensing agent in causing phenol to react with formaldehyde.

In those modifications of my process which employ factis, it may be that both the factis itself and the reaction product of sulfur chlorid and phenol perform together the condensing function.

In order that my invention may be clearly understood, various modes of procedure and the characteristic properties of the product during the different stages of treatment will be hereinafter described.

One method of producing the desired results is as follows: A quantity of factis amounting to approximately 120 parts, by weight, is dissolved in 300 parts of phenol and heated moderately until in complete solution. At this point, a quantity of a 40% aqueous solution of formaldehyde amounting to 320 parts is introduced and heat is applied at from 100° to 125° C. until the excess of water is driven off and the solution is reduced to a viscous, semi-plastic liquid. Upon further heating, the liquid thickens, becomes plastic and is soluble in the usual solvents.

If the heating is further continued, preferably in a suitable condensing apparatus, the plastic substance gradually solidifies into a homogeneous solid mass which is insoluble, infusible and resistant to moisture and to the action of most reagents. This final product possesses a high dielectric strength, is resilient and may be cut and turned in any desired manner.

In certain cases, it may be desirable to increase the temperature to which the plastic intermediate substance is subjected, whereby the process is accelerated, but, in such cases, it will be found advisable to conduct the operation under pressure in order to avoid the escape of gases and air bubbles which tend to render the final product porous.

It, of course, is not necessary that heat be applied in the final solidification, as the same result would be secured eventually without the application of heat. However, the process would be extremely slow and perhaps might cover a period of several months or a year.

When the product is in the viscous state, various inert filling materials may be introduced, such as asbestos, silica, wood flour, mica and similar substances, after which the mass may be heated and hardened into the final infusible, insoluble, solid condition.

Any desired color may be imparted to the product by introducing suitable dyes or pigments at any stage in the process, although this may be accomplished most readily when the products are in solution or in the viscous stage.

If the process be arrested when the substance is in the plastic condition, it will be found that the product may be easily kneaded, molded or otherwise manipulated into any desired shape, after which the final heating will transform the same to a solid. The material may be rendered permanently plastic by the addition of solvents such as camphor or glycerin, and rubber or nitrocellulose may be introduced as fillers. Preferably the last mentioned substances should be added while the material is in solution in order that they may thoroughly mix with the other ingredients to form a homogeneous product.

I have found that, by increasing the proportions of one or more of the above-mentioned solvents, a solid product is obtained which possesses a high degree of resiliency and constitutes a good substitute for celluloid.

Another mode of carrying out my invention is to solidify a mixture of fat or oil and phenol in any proportion by means of sulfur chlorid, after which the resulting substance is dissolved in an excess of phenol until the whole substance is again in solution. Formaldehyde or its polymers may then be added and heat applied, the product then undergoing the same stages of solidification as already set forth and resulting in a final product which is identical in its properties and characteristics to that hereinbefore described. Furthermore, I may react directly upon phenol with sulfur chlorid, either with or without the use of a suitable solvent, such as carbon tetra-chlorid, for the purpose of moderating the action, to form a resin-like substance which may be redissolved in an excess of phenol and solidified to the final state by the addition of formaldehyde and the application of heat, either with or without pressure.

Any of the chlorids of sulfur are suitable for use in carrying out the various modifications of my process, but I prefer to use the disulfur dichlorid or sulfothionyl chlorid, which has the formula $S_2Cl_2$, on account of the relatively greater stability of this compound in comparison with the other chlorids of sulfur.

Those skilled in the art will readily understand that the manner of treatment and mode of procedure may be widely varied in accordance with the desired characteristics of the intermediate or final products, and such variations which do not depart from the spirit and scope of my invention are intended to be covered in the appended claims.

I claim as my invention:

1. A process for the manufacture of resinous products which comprises mixing factis or oil rubber with phenol and hardening the resulting substance by the addition of formaldehyde and the application of heat and pressure.

2. A process for the manufacture of resinous products which comprises mixing phenol with a reaction product of oleaginous material and a sulfur chlorid and hardening the resulting material with formaldehyde.

3. The method of making a resinous product that comprises mixing factis with phenol and solidifying the resulting substance with formaldehyde.

4. A process for the manufacture of resinous products which comprises mixing a reaction product of an oleaginous substance and a sulfur chlorid with phenol.

5. A process for the manufacture of resinous products that comprises reacting upon phenol with formaldehyde in the presence of a condensing agent comprising a reaction product of a sulfur chlorid and an oleaginous substance.

6. A process for the manufacture of resinous products that comprises reacting upon phenol with formaldehyde in the presence of a condensing agent comprising a reaction product of a sulfur chlorid and an oil.

7. A resinous product containing a condensation product of phenol, formaldehyde and a reaction product of an oleaginous substance and a sulfur chlorid.

8. A resinous substance containing a reaction product of phenol and a sulfur chlorid.

9. A resinous substance containing a solid, infusible and homogeneous reaction product of phenol, a sulfur chlorid and formaldehyde.

10. A resinous substance containing a reaction product of oleaginous material and a sulfur chlorid, together with a reaction product of phenol, a sulfur chlorid and formaldehyde.

11. A resinous substance containing a sulfurized vegetable oil and a reaction product of phenol and formaldehyde.

In testimony whereof, I have hereunto subscribed my name this 7th day of June, 1912.

JAMES P. A. McCOY.

Witnesses:
D. H. Mace,
B. B. Hines.

7. A resinous product containing a condensation product of phenol, formaldehyde and a reaction product of an oleaginous substance and a sulfur chlorid.

8. A resinous substance containing a reaction product of phenol and a sulfur chlorid.

9. A resinous substance containing a solid, infusible and homogeneous reaction product of phenol, a sulfur chlorid and formaldehyde.

10. A resinous substance containing a reaction product of oleaginous material and a sulfur chlorid, together with a reaction product of phenol, a sulfur chlorid and formaldehyde.

11. A resinous substance containing a sulfurized vegetable oil and a reaction product of phenol and formaldehyde.

In testimony whereof, I have hereunto subscribed my name this 7th day of June, 1912.

JAMES P. A. McCOY.

Witnesses:
D. H. MACE,
B. B. HINES.

---

Correction in Letters Patent No. 1,194,201.

It is hereby certified that in Letters Patent No. 1,194,201, granted August 8, 1916, upon the application of James P. A. McCoy, of Wilkinsburg, Pennsylvania, for an improvement in "Resinous Products and Methods of Producing Same," an error appears in the printed specification requiring correction as follows: Page 2, line 119, claim 4, before the period insert the words *and hardening the resulting substance;* and that the said Letters Patent should be read with this correction therein that the same may conform to the record of the case in the Patent Office.

Signed and sealed this 19th day of September, A. D., 1916.

[SEAL.]

F. W. H. CLAY,
*Acting Commissioner of Patents.*

Cl. 106—22.

It is hereby certified that in Letters Patent No. 1,194,201, granted August 8, 1916, upon the application of James P. A. McCoy, of Wilkinsburg, Pennsylvania, for an improvement in "Resinous Products and Methods of Producing Same," an error appears in the printed specification requiring correction as follows: Page 2, line 119, claim 4, before the period insert the words *and hardening the resulting substance;* and that the said Letters Patent should be read with this correction therein that the same may conform to the record of the case in the Patent Office.

Signed and sealed this 19th day of September, A. D., 1916.

[SEAL.]

F. W. H. CLAY,
*Acting Commissioner of Patents.*

Cl. 106—22.